United States Patent
Chen et al.

(10) Patent No.: US 12,281,632 B2
(45) Date of Patent: Apr. 22, 2025

(54) CYCLOTURBINE MODULAR RIVER CURRENT ENERGY CONVERTER AND METHOD AND APPARATUS FOR DEPLOYING MARINE HYDROKINETIC TURBINE ASSEMBLY TO HARVEST RIVERINE AND OCEAN TIDAL CURRENT ENERGY

(71) Applicant: Purdue Research Foundation, West Lafayette, IN (US)

(72) Inventors: Jun Chen, West Lafayette, IN (US); Haiyan H. Zhang, West Lafayette, IN (US); Charles Greg Jensen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 48 days.

(21) Appl. No.: 18/584,073

(22) Filed: Feb. 22, 2024

(65) Prior Publication Data
US 2024/0209825 A1 Jun. 27, 2024

Related U.S. Application Data

(63) Continuation of application No. 17/572,232, filed on Jan. 10, 2022, now Pat. No. 11,927,170.
(Continued)

(51) Int. Cl.
*F03B 3/14* (2006.01)
*B63B 1/28* (2006.01)
(Continued)

(52) U.S. Cl.
CPC ............... *F03B 3/145* (2013.01); *B63B 1/28* (2013.01); *B63B 21/16* (2013.01); *B63B 35/44* (2013.01);
(Continued)

(58) Field of Classification Search
CPC ...... F03B 3/145; F03B 17/062; F03B 17/067; B63B 1/28; B63B 21/16; B63B 35/44;
(Continued)

(56) References Cited

FOREIGN PATENT DOCUMENTS

| GB | 2559996 | | 8/2018 | |
|---|---|---|---|---|
| GB | 2559996 | A * | 8/2018 | ............. B63B 1/125 |

* cited by examiner

*Primary Examiner* — Joseph Ortega
(74) *Attorney, Agent, or Firm* — David E. Novak; Brannon Sowers & Cracraft PC

(57) ABSTRACT

A hydrokinetic turbine system for harvesting energy from riverine and tidal sources, including a first floating dock, a marine hydrokinetic turbine mounted on the first floating dock, and a second floating dock. The system further includes a winch assembly mounted on the second floating dock and operationally connected to the first floating dock and a linkage assembly operationally connected to the first floating dock and to the second floating dock. The linkage assembly may be actuated to pull the first floating dock into contact with the second floating dock. The linkage assembly may be actuated to distance the first floating dock from the second floating dock, and the winch assembly may be energized to orient the first floating dock into a position wherein the marine hydrokinetic turbine is above the first floating dock and wherein the winch assembly may be energized to orient the first floating dock into a position wherein the marine hydrokinetic turbine is below the first floating dock.

4 Claims, 4 Drawing Sheets

Related U.S. Application Data

(60) Provisional application No. 63/136,708, filed on Jan. 13, 2021, provisional application No. 63/136,718, filed on Jan. 13, 2021.

(51) Int. Cl.
  *B63B 21/16* (2006.01)
  *B63B 35/44* (2006.01)

(52) U.S. Cl.
  CPC ... *B63B 2035/4466* (2013.01); *F05B 2220/32* (2013.01); *F05B 2240/93* (2013.01); *F05B 2240/95* (2013.01); *F05B 2260/70* (2013.01)

(58) Field of Classification Search
  CPC ............. B63B 2035/4466; B63B 77/10; F05B 2220/32; F05B 2240/93; F05B 2240/95; F05B 2260/70; F05B 2260/04; F05B 2260/72; Y02E 10/30
  See application file for complete search history.

CYCLOTURBINE MODULAR RIVER CURRENT ENERGY CONVERTER AND METHOD AND APPARATUS FOR DEPLOYING MARINE HYDROKINETIC TURBINE ASSEMBLY TO HARVEST RIVERINE AND OCEAN TIDAL CURRENT ENERGY

CROSS-REFERENCE TO RELATED PATENT APPLICATIONS

This patent application claims priority to co-pending U.S. patent application Ser. No. 17/572,232 filed on Jan. 10, 2022 (issued as U.S. Pat. No. 11,927,170 on Mar. 12, 2024), which claims priority to U.S. Provisional Patent Applications 63/136,708 and 63/136,718, both filed on Jan. 13, 2022.

GOVERNMENT FUNDING

This invention was made with government support under DE-EE0008950 awarded by the Department of Energy. The government has certain rights in the invention.

BACKGROUND

The untapped energy carried by the rivers and oceans can potentially provide tens of millions of Americans with locally sourced, clean, and reliable energy, at a level over tens of Tera-Watts-Hour per year (TWh/yr). However, improving the technological, operational, and economic viability of marine and hydrokinetic (MHK) technology and gaining stakeholder acceptance are the two major obstacles to developing commercial-scale low-head river current energy converter (RCEC).

Among all the challenges experienced in developing RCEC systems, the high installation cost is a major one. MHK turbines in RCEC systems are usually installed using three different mounting options: bottom structure mounting (BSM), near-surface structure mounting (NSM), and floating structure mounting (FSM). The horizontal axis hydrokinetic turbines and similar designs often require massive and expensive civil work to construct BSM, which prevents their applications in most riverine applications. The systems utilizing FSM, on the other hand, require significant design effort and investment on the floating and mooring system, which draw an investment even higher than the turbine system itself, as manifested by the floating offshore wind systems. The design knowledge for FSM and NSM structures is very limited as compared with the knowledge for surface-mounted structures. To implement all these mounting options, the RCECs must be first transported to the working site, e.g., by tugboats. They will be then installed with the help of heavy-duty machines like crane boats or attached ballast systems.

In addition, traditional RCEC designs also suffer from high maintenance costs. For routine service (lubrication, changing fault parts, etc.), the entire system needs to be lifted out of the water with the help of a crane boat to gain dry assess, which significantly increases the maintenance cost, especially in remote sites.

The existing designs of RCECs suffer from low efficiency. Both the axial-flow and cross-flow turbines, when deployed in the low-head river current, demonstrate a suboptimal efficiency usually much lower than the theoretical Betz limit (59%) when no duct/diffuser augmentation is adopted. The design of vortex-induced vibration results in a measured efficiency of 28%, while the one using oscillating hydrofoils yields a peak efficiency of 40% at its optimal reduced frequency. The reported efficiency of the sails system is 25%. Failure to significantly improve the efficiency is attributed to the nature of the turbine system itself and also to the design tools that employ simplified models that are not adequate to analyze the complicated interaction between the running river current and rotating turbines.

In addition, traditional hydrokinetic turbines suffer from uneven hydrodynamic loading that is eventually born by the power train as fatigue loading and thus decreases the system reliability with increased maintenance cost.

Thus, there is a need for an improved hydrokinetic turbine and for an improved method and apparatus for deploying a hydrokinetic turbine to harvest energy from river currents. The present novel technology addresses these needs.

BRIEF DESCRIPTION OF THE DRAWINGS

FIG. 3A-3F schematically illustrates a method and assembly for positioning the cycloturbine modular river current energy transducer of FIG. 1 in a river.

DETAILED DESCRIPTION

Figure 1:
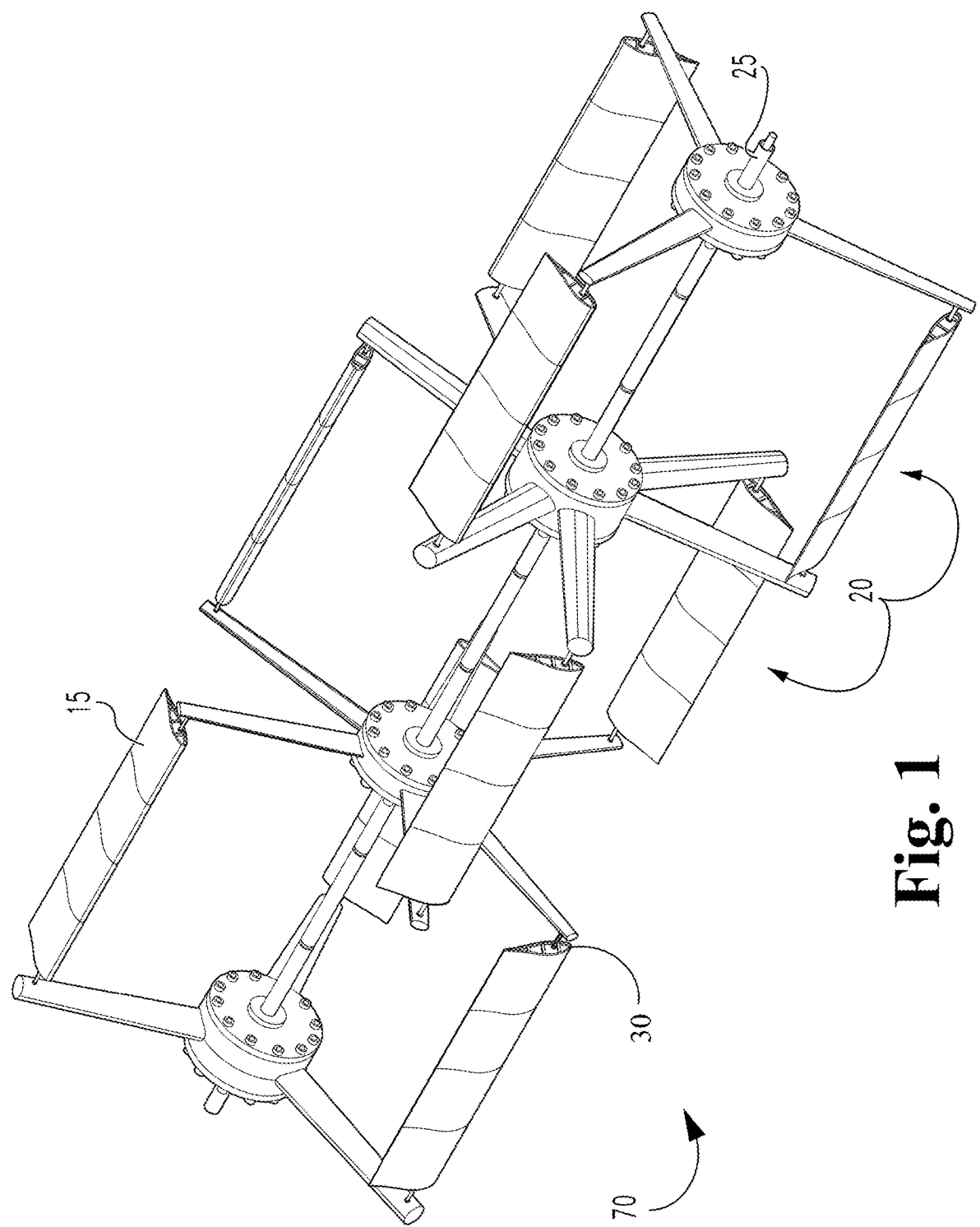
FIG. 1 is a perspective view of a cycloturbine modular river current energy transducer according to a first embodiment of the present novel technology.
Figure 2:
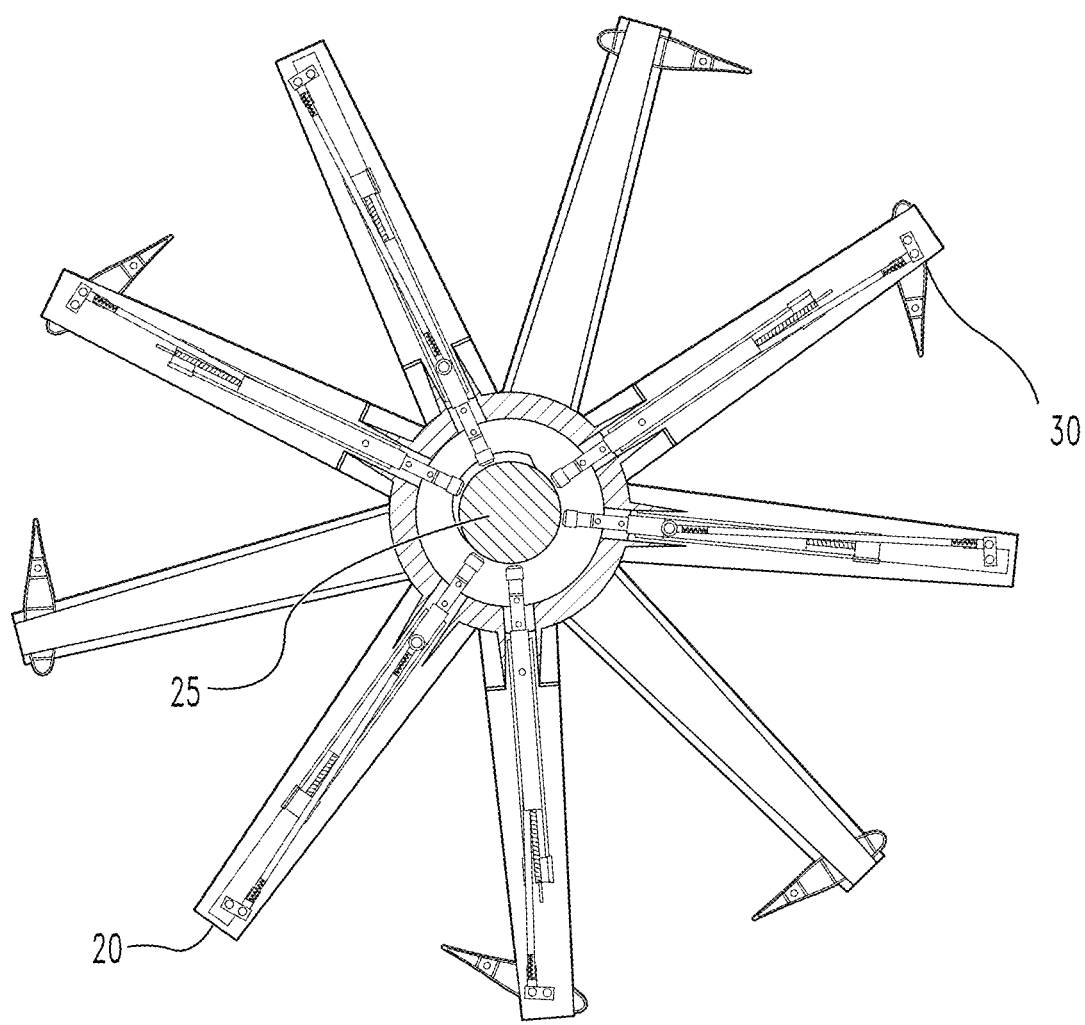
FIG. 2 is a partial cross sectional end view of the cycloturbine modular river current energy transducer of FIG. 1.
Figure 3A:
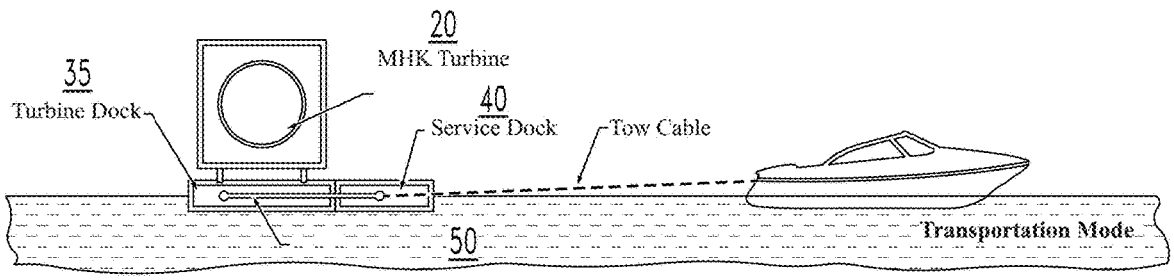
Figure 3F:
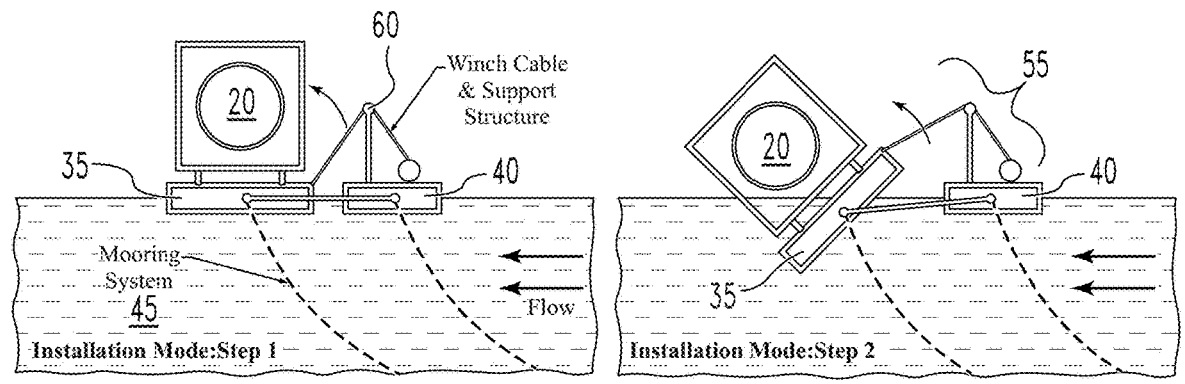
Figure 3F:
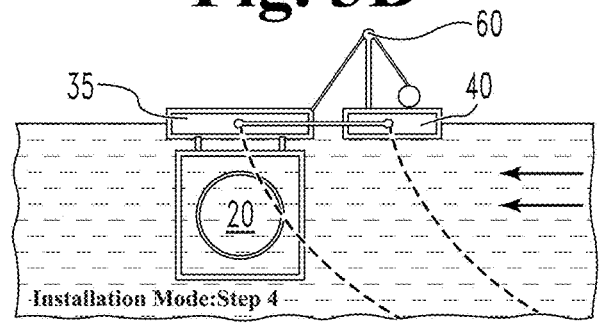
Figure 3F:
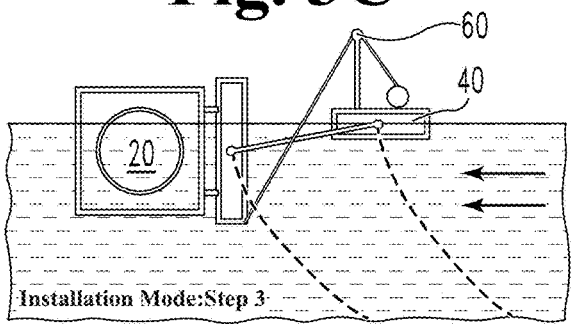
Figure 3F:
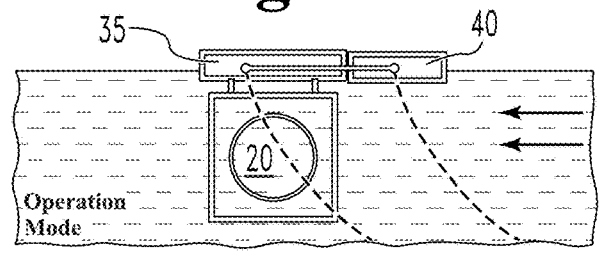
Figure 4:
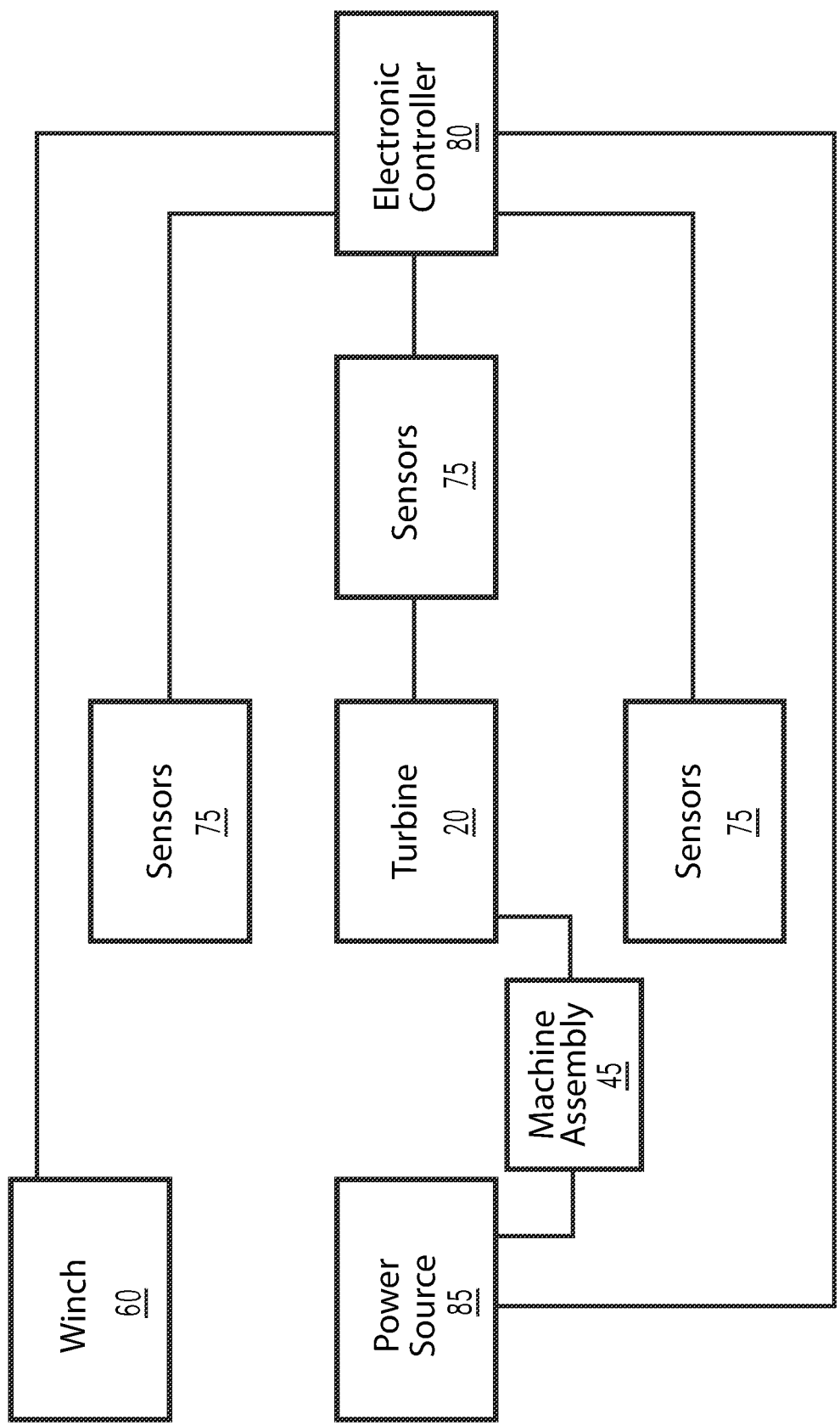
FIG. 4 is a schematic illustration of the method for positioning the cycloturbine modular river current energy transducer of FIG. 1 is a river.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The novel MRCEC assembly 70 adopts a three-section design of cycloidal turbine 20 as shown in FIG. 1. A total of nine hydrofoils 15, three for each section (typically equidistantly spaced), take the hydrodynamic force when they are submerged into running river current. The MRCEC assembly 70 three-section design also enables smooth energy harvest at different rotating phases so there are no oscillatory loads generated by the turbine 20. High-fidelity computational fluid dynamics (CFD) simulations indicate that the hydrodynamic efficiency of this design reaches nearly 50%, significantly higher than other existing designs. The loads applied to the turbine support 25 are nearly uniform over the entire revolution. The 3D cam mechanism 30 also enables active control of the turbine operation so the turbine 20 can be set at four different modes: (1) startup mode, where the hydrofoil 15 pitch is adjusted to gain enough force to turn the turbine 20 by the river flow, (2) high-efficiency mode, where the hydrofoil 15 pitch scheme is set to harvest maximal energy at different income flow conditions, (3) constant power mode, where the turbine 20 operates at the peak efficiency when the river flow is larger than the designed maximum flow speed, and (4) park mode, where the hydrofoil 15 is controlled to generate large drag so the turbine 20 does not rotate thus it is for easing on-site maintenance.

The present novel technology also contemplates a method of installing and servicing the MHK turbines to increase energy affordability and availability, in particular, to remote communities. This methodology features a unique approach that adopts two floating docks (a service dock 40 and a turbine dock 35 for mounting the MHK turbine 20). The entire system 10 can be set at four different modes: transportation mode, installation mode, operation mode, and service mode, as shown in FIG. 3A-3F.

In the transportation mode, the MHK turbine 20 sits on top of the turbine dock 35 and is connected to the service dock 40. A tugboat tows the system 10 to the preselected or desired working site or marina.

The installation mode is implemented in four steps (FIGS. 3B-3E). Once the assembly arrives at its predetermined working site, the mooring system is deployed to anchor the assembly in the middle of the river or ocean current. A linkage assembly 50 maintains a safe distance between the two docks. A winch system 55 is set up on the service dock 40 and the cable is connected to the turbine dock 35. The winch 60 is energized to flip the turbine dock 35 and MHK turbine 20 together until the turbine 20 is completely submerged into water.

In the operation mode (FIG. 3F), the two docks are connected tightly. The turbine 20 is actuated to harvest energy as designed.

In the service mode, the procedure in the installation mode is reversed so the turbine 20 will be flipped out of the water to gain local dry access for service and maintenance.

Comparing to other existing designs, this new design offers a self-contained solution—it does not need to employ extra machines like a crane boat for installation and maintenance. It thus eases the operation and minimizes the installation and maintenance cost.

Additionally, the present system provides a novel cycloturbine-type modular river current energy converter (MRCEC) that can effectively harvest from the nation's rivers to increase energy affordability and availability, in particular, to remote communities.

Cycloidal turbines (cycloturbines) are designed to vary the blade pitch angle throughout each revolution to maximize the energy harvest. The traditional fixed-pitch Darrieus turbines often operate at angles of attack that either prevent power extraction or stall the blade during a portion of their revolution. These counterproductive aerodynamic forces attenuate available turbine power, cause damaging oscillatory loads, and prohibit self-start at a low rotational speed. Cycloidal turbines overcome these difficulties. However, the proper selection of blade pitching scheme is nontrivial and most of the previous efforts were based on a certain trial-and-error approach.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A cycloidal turbine assembly, comprising:
    a first section defining a first set of three operationally connected hydrofoils;
    a second section defining a second set of three operationally connected hydrofoils;
    a third section defining a third set of three operationally connected hydrofoils;
    a cam; and
    a linkage assembly operationally connected to the cam and to each respective section;
    wherein the first, second, and third sections are operationally connected to one another;
    wherein each respective section defines an independently variable pitch angle; and
    wherein the linkage assembly adjusts the rotating phase angels of each respective section.

2. The cycloidal turbine assembly of claim 1 and further comprising:
    a plurality of water flow sensors arrayed about the cycloidal turbine; and
    an electronic controller operationally connected to the plurality of water flow sensors and to the linkage assembly;
    wherein the electronic controller induces the linkage assembly to independently vary the rotating phase angle of each section to optimize hydrofoil operating efficiency.

3. The cycloidal turbine assembly of claim 2 wherein the electronic controller induces the linkage assembly to vary the rotating phase angle of each section to minimize oscillatory loads generated by the cycloidal turbine.

4. The cycloidal turbine assembly of claim 1, wherein the linkage assembly may induce sections to be pitched for gaining enough force from flowing water to turn the turbine; wherein the linkage assembly may induce sections to be pitched for generating a maximum amount of energy from flowing water; and wherein the linkage assembly may induce sections to be pitched for not turning in response to flowing water.

* * * * *